United States Patent
Pan et al.

(10) Patent No.: US 11,310,349 B1
(45) Date of Patent: Apr. 19, 2022

(54) TRANSFORMING MULTIVARIATE TIME SERIES DATA INTO IMAGE DATA TO GENERATE IMAGE-BASED PREDICTIONS

(71) Applicant: Amazon Technologies, Inc., Seattle, WA (US)

(72) Inventors: David L Pan, Seattle, WA (US); Roger Thomas John Moffatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 16/878,506

(22) Filed: May 19, 2020

(51) Int. Cl.
| | |
|---|---|
| H04L 29/06 | (2006.01) |
| H04L 29/08 | (2006.01) |
| H04N 19/103 | (2014.01) |
| G06F 16/2458 | (2019.01) |
| H04N 19/176 | (2014.01) |
| H04N 19/159 | (2014.01) |
| H04L 67/01 | (2022.01) |
| H04L 67/02 | (2022.01) |
| H04L 67/10 | (2022.01) |
| H04L 69/329 | (2022.01) |

(52) U.S. Cl.
CPC .......... *H04L 67/42* (2013.01); *G06F 16/2477* (2019.01); *H04L 67/02* (2013.01); *H04L 67/10* (2013.01); *H04L 69/329* (2013.01); *H04N 19/103* (2014.11); *H04N 19/159* (2014.11); *H04N 19/176* (2014.11)

(58) Field of Classification Search
CPC combination set(s) only.
See application file for complete search history.

(56) References Cited

U.S. PATENT DOCUMENTS

| | | | |
|---|---|---|---|
| 8,972,308 B2 | 3/2015 | Hao et al. | |
| 2014/0156806 A1* | 6/2014 | Karpistsenko | H04L 29/06027 709/219 |
| 2016/0217379 A1 | 7/2016 | Patri et al. | |
| 2017/0372224 A1* | 12/2017 | Reimann | G06N 20/00 |
| 2019/0310650 A1* | 10/2019 | Halder | G06N 3/006 |
| 2020/0074269 A1* | 3/2020 | Trygg | G06N 7/00 |
| 2021/0012191 A1* | 1/2021 | Qiao | G06N 3/0445 |
| 2021/0076212 A1* | 3/2021 | Manikantan Shila | H04L 63/0861 |
| 2021/0350225 A1* | 11/2021 | Dang | G06N 3/04 |

* cited by examiner

*Primary Examiner* — El Hadji M Sall
(74) *Attorney, Agent, or Firm* — Robert C. Kowert; Kowert, Hood, Munyon, Rankin & Goetzel, P.C.

(57) ABSTRACT

An image-based prediction service of a provider network may receive multivariate time series data (e.g., from different sensors for a machine) from a remote network of the client. The multivariate time series data includes different time series of data that are obtained from different data sources (e.g., sensors) over a time period. The image-based prediction service may transform the multivariate time series data into image data that represents an image. The image-based prediction service may then process the image data using one or more image processing models to generate a prediction (e.g., machine failure within a week). The image-based prediction service may send the prediction to the remote network.

20 Claims, 9 Drawing Sheets

TRANSFORMING MULTIVARIATE TIME SERIES DATA INTO IMAGE DATA TO GENERATE IMAGE-BASED PREDICTIONS

BACKGROUND

The demand for analyzing data collected from multiple data sources continues to grow as organizations take advantage of the wide variety of devices that are capable of measuring and generating data. For example, a product manufacturer may collect, over a period of time, data from multiple sensors (temperature, pressure, etc.) mounted on or close to equipment on an assembly line in order to monitor various conditions that may affect current or future performance of the equipment.

Data collected from multiple data sources over a period of time ("multivariate time series data") may be difficult to analyze, in particular when massive amounts of data are collected from many different data sources. Moreover, many of the measurements may have little or no correlation with each other over time. As more data sources are added throughout manufacturing plants and various other environments, the task of analyzing multivariate time series data to extract useful information becomes even more challenging.

Figure 1:
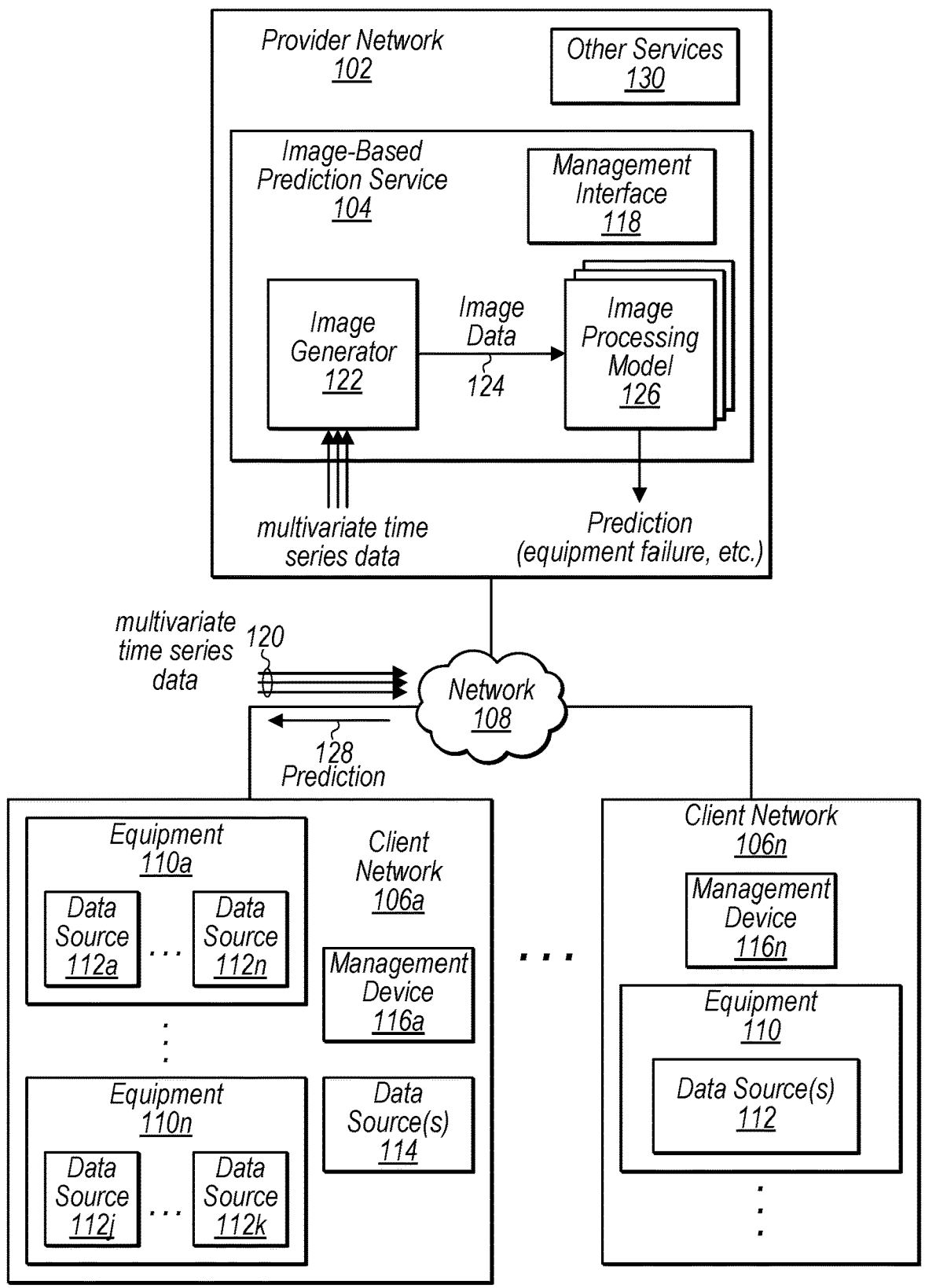
FIG. 1 is a logical block diagram illustrating a system for transforming multivariate time series data into image data to generate image-based predictions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to transform multivariate time series data into image data to generate image-based predictions, according to some embodiments. In embodiments, transforming multivariate time series data into image data and using powerful image processing models to generate predictions based on the image data may improve the speed and/or accuracy for making predictions (and/or identifying anomalies) compared to other techniques. For example, image processing models may be trained to quickly and accurately classify images in order to predict whether equipment on an assembly line will fail within a certain period of time (e.g., within the next week, month, etc.).

Embodiments described herein may employ various techniques to transform multivariate time series data into image data. In embodiments, the image data may represent a heat map that includes different colors and/or different intensities at different locations of an image. The image data may be a set of data that includes different values that represent different colors and/or different intensities at different locations of a heat map. In embodiments, some of the values are lower than other values (e.g., lower intensity or different color) and also higher than other values (e.g., higher intensity or different color).

Multivariate time series data may include two or more different time series of data. Each time series of data may be collected from a different data source (e.g., sensor) over a period of time. At least some or all of the time series of data collected may be non-image data (e.g., data that is not collected from cameras or other image-based sensors). To transform the multivariate time series data into image data, an image-based prediction service may transform each of the time series of data into a subset of the image data, resulting in multiple subsets of the image data. Each subset of image data may include different values that represent varying amounts of color and/or intensity. The image-based prediction service may then generate the set of data that represents the image, based on a combination of the subsets of image data.

Some embodiments may transform (e.g., using a Fourier-based transformation) multivariate time series data into image data that represents multiple spectrograms in the form of heat maps. In other embodiments, the multivariate time series data is transformed into a lasagna plot that includes multiple heat map "layers," where each layer is based on a different time series of the multivariate time series data. In various embodiments, any suitable technique or combination of techniques may be used to transform multivariate time series data into image data (e.g., image data for a heat map or any other type of image). As discussed herein, the power of image processing models may then be leveraged to quickly and accurately generate predictions based on the image data.

In some embodiments, multivariate time series data may include any number of time series data obtained from any number of respective data sources over a time period. Moreover, each time series data may include any type of data obtained from any type of data source (e.g., different types of data). For example, multivariate time series data may include time series data from a temperature sensor, time series data from a humidity sensor, time series data from a pressure sensor, and time series data from an additional pressure sensor, resulting in multivariate time series data that includes four different time series data (or four different sets of time series data).

In embodiments, an image processing model may identify (e.g., using pattern or object recognition) a pattern (signature) in the image data. In embodiments, pattern or object recognition may refer to a collection of one or more computer vision tasks (e.g. classification, detection, segmentation, localization, etc.) implemented by one or more models (e.g., using image data as input) to identify one or more patterns and/or other items of relevance in the image data. For example, an image processing model may identify a particular pattern (e.g., associated with a type of equipment failure) by implementing one or more tasks to analyze/process data that represents an image (e.g., a heat map). In response, the image processing model may predict the type of equipment failure will occur. In embodiments, any suitable type of image processing models may be implemented such as convolutional neural networks (CNNs).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 9 and described below.

This specification begins with a description of a system for transforming multivariate time series data into image data to generate image-based predictions. A number of different methods and techniques to transform multivariate time series data into image data to generate image-based predictions are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for transforming multivariate time series data into image data to generate image-based predictions, according to some embodiments.

In the depicted embodiment, a provider network 102 includes an image-based prediction service 104 that implements transforming of multivariate time series data into image data to generate image-based predictions. As discussed in detail below, the image-based prediction service 104 may receive multivariate time series data from any remote client network 106, transform the multivariate time series data into image data, process the image data to generate a prediction, and generate a response based on the prediction (e.g., send the prediction back to the client network and/or to another endpoint at the provider network).

As shown, the different client networks 106 are remotely located from the provider network 102 (e.g., in a local (private) network of the client separate from a local network of the provider network). Devices within a given client network 106 may communicate with the provider network (or other networks) via a wide-area network 108 (e.g., the Internet). Different client networks may be controlled and/or owned by different clients of the service 104 and/or provider network. In embodiments, each client network may include any number of different types of devices.

In the depicted embodiment, the client network 106a includes different equipment 110, each of which may include and/or otherwise be associated with any number of data sources 112 (e.g., temperature sensors). Equipment may be any type of device (e.g., a machine on an assembly line). The client network 106a also includes one or more data sources 114 that may apply to multiple equipment (e.g., not just one machine). For example, a data source 114 may measure the ambient temperature of a room that includes multiple machines. A management device 116 may be used to interact with a management interface 118 (e.g., via a graphical user interface and/or application programming interface) of the image-based prediction service 104 to configure various aspects of the service.

As shown, multivariate time series data 120 collected at the client network 106 from different data sources (e.g., data sources associated with equipment 110a) over a period of time (e.g., a recent 5 minute period, the last hour, etc.) is sent from the client network 106 to an image generator 122 of the image-based prediction service 104. The image generator 122 transforms the multivariate time series data into image data 124 (e.g., a spectrogram or a heat map). The image data 124 may include a set of data representing the image.

In the depicted embodiment, the image data 124 is sent to one or more image processing models 126. The one or more image processing models 126 process the image data to generate a prediction 128 associated with the remote network (e.g., the equipment). For example, the prediction may indicate that the equipment will fail within an upcoming time period (e.g., within a future window of time, within the next week, etc.) and/or the type of failure that will occur. Also shown are one or more other service 130 of the provider network, such as compute services and storage services. For example a storage service may store any number of models that may be obtained by the image-based prediction service to generate predictions based on processing image data.

Figure 2:
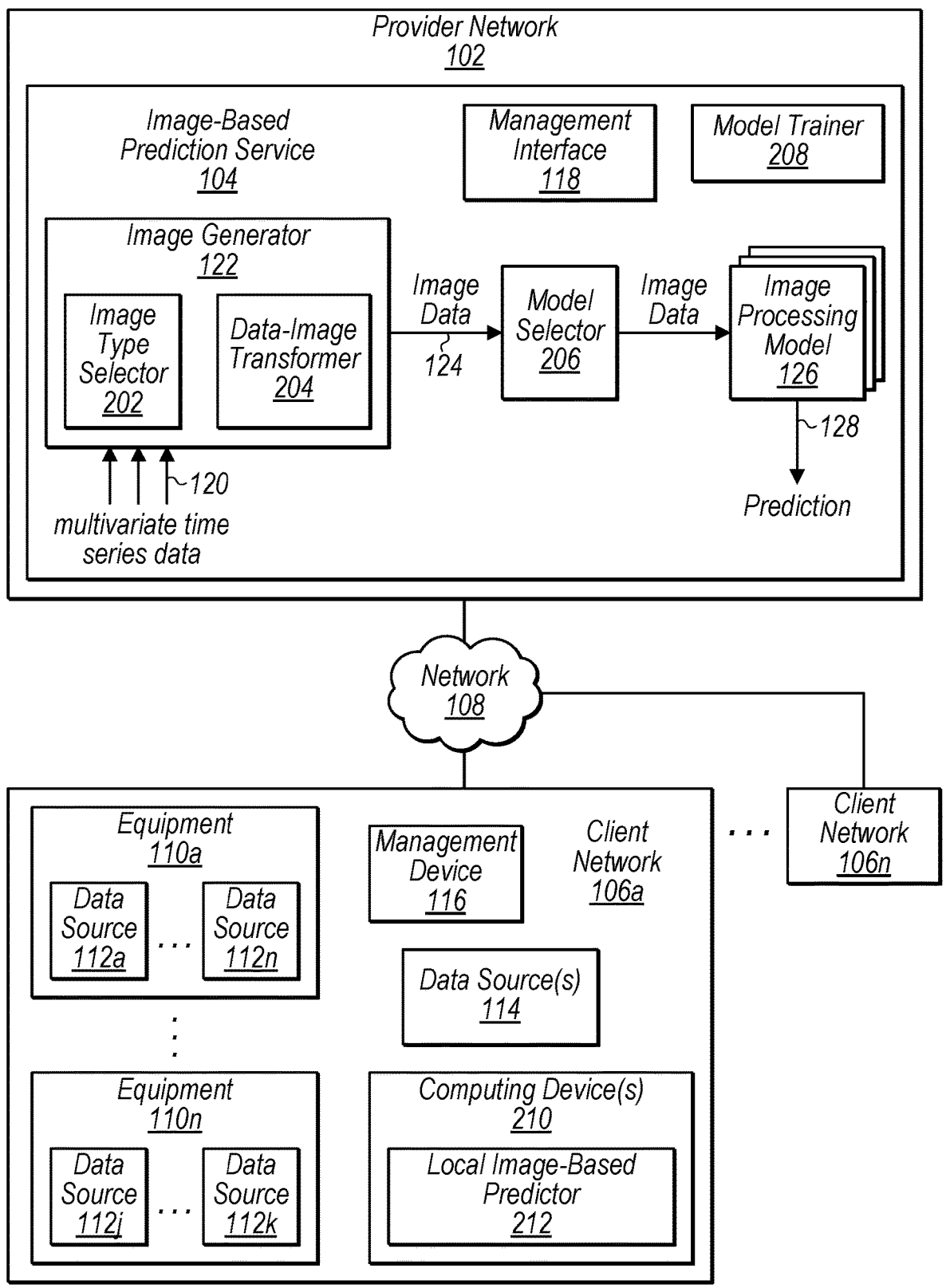
FIG. 2 is a logical block diagram illustrating systems for transforming multivariate time series data into image data to generate image-based predictions, according to some embodiments.

FIG. 2 is a logical block diagram illustrating systems for transforming multivariate time series data into image data to generate image-based predictions, according to some embodiments.

As shown, the provider network 102 includes an image-based prediction service 104 that implements transforming of multivariate time series data into image data to generate image-based predictions. In the example embodiment, the image generator includes an image type selector 202 and a data-image transformer 204.

In embodiments, the image type selector 202 receives the multivariate time series data and analyzes the multivariate time series data. Based on the analysis, the image type selector 202 selects, from multiple available types of image data, a type of image data to transform the multivariate time series data into. Different algorithms may be applied to a multivariate time series to produce different types of image data. For example, a fast-Fourier transform (FFT) algorithm may produce multiple spectrograms (one for each time series of data), whereas a different algorithm may produce algorithm may produce a lasagna plot. Furthermore, one algorithm may use one type of FFT to produce spectrograms, whereas a different algorithm may use a different type of FFT to produce different spectrograms. As another example, one algorithm produce a lasagna plot with a certain order of layers and/or color distribution, whereas a different algorithm may produce a lasagna plot with a different order of layers and/or color distribution.

The image type selector 202 may use any type or combination of analysis techniques to select the type of image data as a result of the analysis. For example, a selector data processing model or algorithm may receive and/or use any portion of the multivariate time series data as input (e.g., the first 5 KB or first 10%, the first 5 seconds of the data collected for the time period, or all of the data), process the portion of multivariate time series data, and select the type of image data to be used.

In some embodiments, the selector data processing model may be trained based on training data supplied by the client and/or provider network that indicates the best type of image data to use, depending on the characteristics of multivariate time series data (e.g., the type of image data that will result in the most accurate prediction when processed by any of the available image processing models). For example, for multivariate time series data with certain characteristics (e.g., number of different time series of data, number and/or frequency of data values collected in each series of data and/or range of values in each series of data, etc.), one type of image data may be selected to allow for the most accurate prediction, whereas for other multivariate time series with different characteristics (e.g., higher or lower values for one or more of the above characteristics), another type of image data may be selected to allow for the most accurate prediction.

In some embodiments, the image type selector 202 may take into account additional data that is received with/associated with the multivariate time series data in order to select the type of image data to transform the multivariate time series data into. For example, the image type selector 202 may receive data indicating the particular device (e.g., machine/equipment) associated with the multivariate time series data, the type and/or configuration of the device associated with the multivariate time series data, the location of the device associated with the multivariate time series data, and/or the type of data collected and/or the type of sensor used to collect data for each time series of data.

Based on the additional data, the image type selector 202 may select from a smaller subset of a total number of different types of image data that are available. For example, if there are five different types of image data available to transform multivariate time series data into, the image type selector 202 may consider only two of those types of data for its selection analysis. This may reduce the amount of time for the image type selector 202 to select a type of image data to transform the multivariate time series data into (reducing the overall time and/or usage of compute resources to generate a prediction).

After the image type selector 202 selects the type of image data to transform the multivariate time series data into, the data-image transformer 204 may transform the multivariate time series data into the image data of the selected type. For example, the data-image transformer 204 may transform the multivariate time series data into image data that represents spectrograms, a lasagna plot, or another type of image or heat map.

In embodiments, the image generator 122 sends the generated image data 124 to a model selector 206. The model selector 206 may select, from among multiple available image processing models 126, one or more particular image processing models to process the image data (based on the type of the image data and/or characteristics of the image data). Thus, different image processing models may be configured to process different types of image data, depending on the type of image data and/or characteristics. For example, one image processing model may be selected to process image data representing a lasagna plot, while another may be selected to process image data representing a spectrogram. As another example, one image processing model may be selected to process image data representing a spectrogram with certain characteristics (e.g., certain pattern(s) and/or distribution of colors/intensities), while another may be selected to process image data representing a spectrogram with different characteristics (e.g., other pattern(s) and/or other distribution of colors/intensities).

In embodiments, a selector model may be trained based on training data supplied by the client and/or provider network that indicates the best image processing model(s) to use, depending on the characteristics of image data (e.g., the image processing model(s) that will result in the most accurate prediction 128 when used to process the image data). For example, for image data with certain characteristics (e.g., certain pattern(s) and/or distribution of colors/intensities), one particular image processing model(s) may be selected to allow for the most accurate prediction, whereas for other image data with different characteristics (e.g., different pattern(s) and/or distribution of colors/intensities), another image processing model(s) may be selected to allow for the most accurate prediction.

In some embodiments, the model selector 206 may take into account additional data that is received with/associated with the multivariate time series data (or image data) in order to select the image processing model(s) to transform the multivariate time series data into. For example, the model selector 206 may receive data indicating the particular device (e.g., machine/equipment) associated with the multivariate time series data/image data, the type and/or configuration of the device associated with the multivariate time series data/image data, and/or the location of the device associated with the multivariate time series data/image data.

Based on the additional data, the model selector 206 may select from a smaller subset of a total number of image processing models that are available. For example, if there are fifty different image processing models available, the model selector 206 may consider only twenty of them for its selection analysis. This may reduce the amount of time for the model selector 206 to select an image processing model(s) to process the image data (reducing the overall time and/or usage of compute resources to generate a prediction).

In the depicted embodiment, the image-based prediction service includes a model trainer 208 that may perform training for any of the models described herein. For example, the model trainer may train each of the image processing models 126 based on training data (e.g., supplied by the client and/or provider network). The training data may include any number of different image data and corresponding predictions (e.g., predictions for current or future conditions of a device such as a machine/equipment at a client's site).

In an embodiment, the training data may include an image with a particular pattern/signature that corresponds to a failure of a device within a period of time or at a particular time (e.g., within one week, or 10 days from now). Therefore, when a selected image processing model identifies that a same or similar pattern is in an image that is generated for a particular device operating at a client's site, then the image processing model may generate a prediction that the particular device will fail within that period of time or at that particular time (e.g., within one week, or 10 days from now).

As another example, the training data may include an image with a particular pattern/signature that corresponds to a certain type failure of a device within a period of time or at a particular time (e.g., failure due to overheating). Therefore, when a selected image processing model identifies that a same or similar pattern is in an image that is generated for a particular device operating at a client's site, then the image processing model may generate a prediction that the particular device will fail due to overheating. In embodiments, a pattern/signature may corresponds to any prediction or combination of predictions of conditions and/or outcomes. For example, a particular pattern/signature may correspond to failure of a device within a week due to overheating. By leveraging trained image processing models, an image-based prediction service may quickly determine any number of predictions, improving a client's ability to implement predictive maintenance and reduce equipment downtime.

In embodiments, a client network 106 may include one or more computing devices 210 that implement a local image-based predictor 212 that may perform some or all of the functionality of the image-based prediction service 104. For example, the client network may download code from the provider network 102 that implements some or all of the functionality of the image-based prediction service 104 when executed locally at the computing device(s) 210 of the client network 106. This may allow the client to obtain results faster because multivariate time series data does not need to be transmitted to the provider network and predictions do not need to be transmitted back to the client network.

In some embodiments, the client may require high end and expensive computing devices in order to implement a local image-based predictor 212. Therefore, in some embodiments only some of the functionality of the image-based prediction service 104 may be implemented by the image-based predictor 212 due to limited computing capability of the computing devices 210. In this case, some of the functionality may be implemented locally and some may be implemented at the provider network. For example, the model trainer may remain at the provider network and may download trained models to the client network for use by the local image-based predictor 212. In various embodiments, any portion of the described components or functionality of the image-based prediction service 104 may be implemented at the client network and/or the provider network.

Figure 3A:
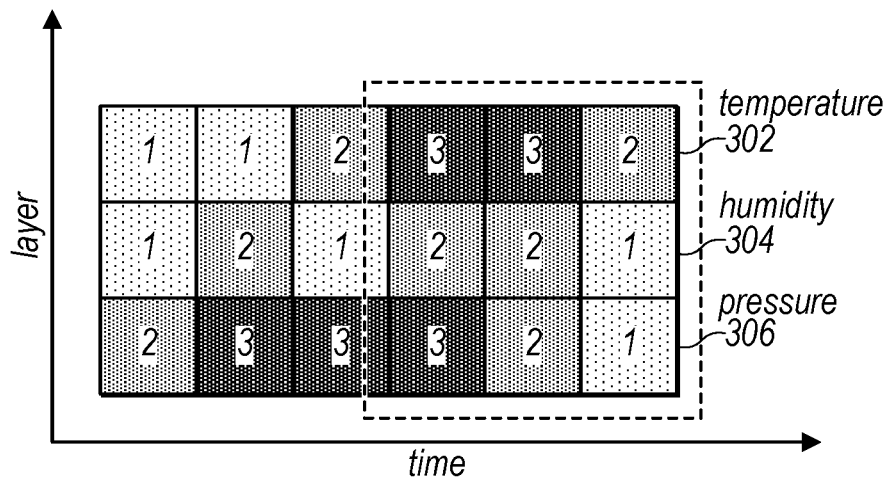
FIG. 3A is an illustration of a lasagna plot based on transforming multivariate time series data into image data that may be used to train an image processing model, according to some embodiments.

FIG. 3A is an illustration of a lasagna plot based on transforming multivariate time series data into image data that may be used to train an image processing model, according to some embodiments.

In the depicted embodiment, the image-based prediction service transforms multivariate time series data for a machine (e.g., on an assembly line at a client site) into image data for a lasagna plot with three layers. The image data includes a set of measurement data representing a lasagna plot. In the depicted example, the set of data includes a time series of temperature data 302, a time series of humidity data 304, and a time series of pressure data 306.

In embodiments, a lower image value for a portion of the image may be represented as a "1" and as a particular color and/or lower intensity on the lasagna plot. A middle image value for a data point may be represented as a "2" and as a different color and/or higher intensity on the lasagna plot. A higher image value for a data point may be represented as a "3" and as a different color and/or even higher intensity on the lasagna plot.

In the example embodiment, the image generator transforms each of the time series of data into a layer of the lasagna plot that is based on six different values for color and/or intensity per layer (e.g., an image value is assigned to six different portions of a layer). However, in various embodiments, the image generator may transform any number of time series of data into any number of layers that are each based on any number of different image values of color and/or intensity. In embodiments, any type of image/heat map (spectrogram, lasagna plot, etc.) may be generated by transforming any number of time series of data into any number of different image values of color and/or intensity that each correspond to a different portion of the image (e.g., a different pixel or area that is assigned an image value).

In some embodiments, the image generator may perform any number of operations (e.g., averaging multiple measurements) to the raw data values (e.g., values received from data sources) of some or all of the time series of data in order to generate the image values for the image data. For example, if the time series of data for the temperature included 36 measurements, then the image generator may average every six sequential measurements to obtain six average temperature measurements for the temperature layer of the lasagna plot. To normalize the six average temperature values into six image values, the bottom one-third of average temperature values may be assigned a "1," the middle one-third of average temperature values may be assigned a "2," and the top one-third of average temperature values may be assigned a "3." As shown, this results in the set of data "1," "1," "2," "3," "3," "2," representing the color and/or intensity of the six portions of the temperature layer. Note that in the examples of FIGS. 3, 5, and 6, the numerical image values are shown within each corresponding portion of the lasagna plot for ease of reference, and in various embodiments they may not be shown/displayed as part of the lasagna plot. Therefore, in various embodiments, a given display device may display a lasagna plot (e.g., the different colors and/or intensities) without displaying the corresponding numerical value itself.

A similar process may be performed to obtain the image data for the humidity and pressure. For example, the above process (or similar process) may be performed on a time series of data for the humidity and pressure that respectively include 24 and 6 measurements. In embodiments, any suitable technique may be used to take into account a number of measurements that are not evenly divisible by the number of portions of a layer (or a particular area of an image). For example, if there are 25 humidity measurements, then the last measurement may be discarded, or the last image value of the humidity layer may be based on the average of the last 5 humidity measurements (the other image values of the layer would each be based on 4 humidity measurements).

In embodiments, the image data for the depicted lasagna plot may be used by the model trainer to train an image processing model to generate a prediction. For example, the image data for the depicted lasagna plot may correspond to a failure of a machine within a week due to overheating. Based on one or more past observations (and/or based on human training input/feedback), the model trainer may determine that the machine fails (or is likely to fail) due to overheating within one week of identifying the image data that represents the pattern within the dashed square (e.g., a failure pattern or failure signature). Therefore, the image processing model may be trained to generate a prediction of failure of the machine due to overheating within a week when it identifies the failure pattern or identifies a pattern that is similar to the failure pattern.

Figure 3B:
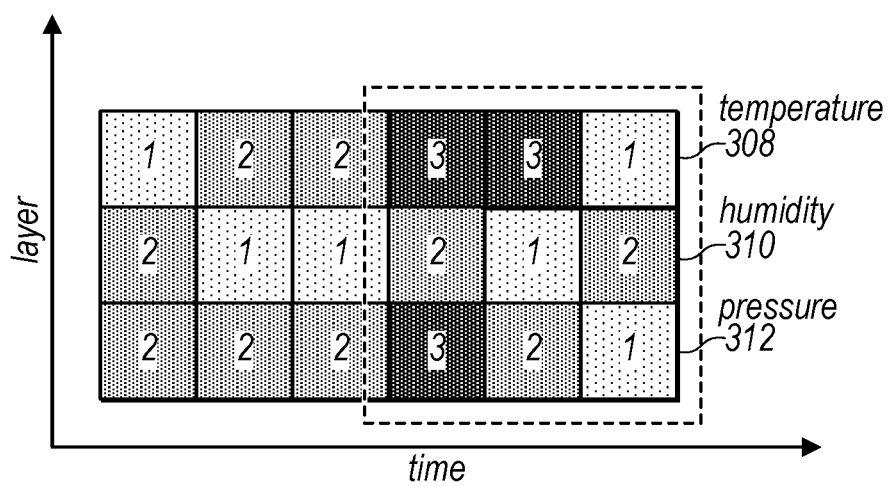
FIG. 3B is an illustration of a lasagna plot based on transforming multivariate time series data into image data that includes a failure pattern for a machine, according to some embodiments.

FIG. 3B is an illustration of a lasagna plot based on transforming multivariate time series data into image data that includes a failure pattern for a machine, according to some embodiments.

In the example embodiment, an image processing model may be trained based on image data representing one or more different images, including the image of FIG. 3A. The trained image processing model may identify image data (based on subsequently collected time series of data for temperature data 308, humidity data 310, and pressure data 312) that represents the pattern within the dashed square as similar to the training image data that represents the pattern within the dashed line of FIG. 3A. Therefore, the image processing model may generate a prediction of failure of the machine due to overheating within a week.

In various embodiments, the trained image processing model may use any suitable technique to identify the image data as similar to the training image data. For example, the trained image processing model may determine that the image data is within a threshold of similarity to the training image data.

In some embodiments, the trained image processing model may determine that the image data is within a threshold of similarity to the training image data by assigning a similarity score that indicates how similar the image data is to the training image data. For example, the score may be an integer of a set of possible numbers (e.g., 1-10 from lowest to highest similarity) that indicate a similarity score. The trained image processing model may determine a similarity score of "9" for the identified image data within the dashed line, indicating that the imaged data is very similar to that of FIG. 3A. In response, the trained image processing model may identify the image data as similar to the training image data and therefore generate a prediction of failure of the machine due to overheating within a week.

In embodiments, to identify image data that represents a pattern, a CNN may perform two dimensional (e.g., 2D) convolution. However, in some embodiments, a CNN may perform one dimensional (e.g., 1D) convolution. To process the image data, the CNN may apply 1D convolution along each of the subsets of the image data that represent a layer of the lasagna plot to generate a prediction. In this case, the order of the layers may not affect the image processing or the prediction, and the 1D convolution may be performed much faster than 2D convolution. However, in some cases, 2D convolution may be desired in order to detect additional patterns that may appear when layers are arranged in a certain order. In those cases, a CNN may be selected to perform 2D convolution. Based on training data, a human and/or a machine learning model may determine whether a 1D or 2D CNN model may one of the models available for selection when processing particular multivariate time series data (e.g., from particular data sources associated with a particular machine).

Figure 4A:
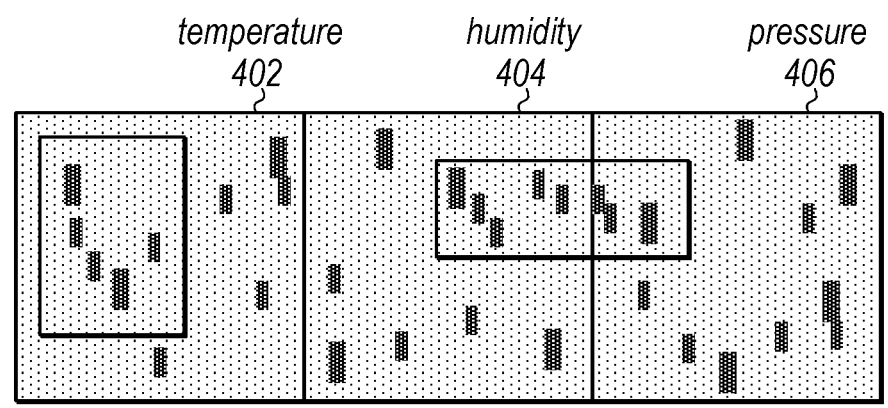
FIG. 4A is an illustration of a spectrogram based on transforming multivariate time series data into image data that may be used to train an image processing model, according to some embodiments.

FIG. 4A is an illustration of a spectrogram based on transforming multivariate time series data into image data that may be used to train an image processing model, according to some embodiments.

In the depicted embodiment, the image-based prediction service transforms multivariate time series data for a machine (e.g., on an assembly line at a client site) into image data for spectrograms. The image data includes a set of measurement data representing multiple spectrograms. In the depicted example, the set of data includes a time series of temperature data 402, a time series of humidity data 404, and a time series of pressure data 406. As shown, image data representing a spectrogram is generated from each of the time series of data and the image data for each spectrogram may be combined and/or concatenated into image data that represents one image to be processed by an image processing model.

Similar to FIGS. 3A and 3B, the spectrograms may be in the form heat maps with different image values representing different colors and/or different intensities for different portions of the image. For example, a lower image value for a portion of the image may be represented as a "1" and as a particular color and/or lower intensity on a spectrogram, a middle image value for a data point may be represented as a "2" and as a different color and/or higher intensity on a spectrogram, and a higher image value for a data point may be represented as a "3" and as a different color and/or even higher intensity on a spectrogram.

In the example embodiment, the image generator transforms each of the time series of data into a different spectrogram. In embodiments, any type of spectrograms may be generated by transforming any number of time series of data into any number of different image values of color and/or intensity that each correspond to a different portion of a spectrogram (e.g., a different pixel or area that is assigned an image value).

In embodiments, the image generator may perform any suitable technique on each time series of data to generate a different spectrogram (e.g., FFT transform, etc.). As described for FIGS. 3A and 3B, the image generator may perform any number of operations (e.g., averaging multiple measurements) to the raw data values (e.g., values received from data sources) of some or all of the time series of data in order to generate the image values for the image data. For example, the image generator may average multiple temperature measurements to obtain smaller number of average measurements before performing an FFT transform on the smaller number of average measurements. A similar process may be performed to obtain the image data for the humidity and pressure.

In embodiments, the image data for the depicted spectrograms may be used by the model trainer to train an image processing model to generate a prediction. For example, the image data for the depicted spectrograms may correspond to a failure of a machine within a week due to overheating. Based on one or more past observations (and/or based on human training input/feedback), the model trainer may determine that the machine fails (or is likely to fail) due to overheating within one week of identifying the image data that represents the two patterns within the left and right rectangles (e.g., a failure pattern or failure signature). Therefore, the image processing model may be trained to generate a prediction of failure of the machine due to overheating within a week when it identifies the two failure patterns or identifies two pattern that are similar to the two failure patterns.

Figure 4B:
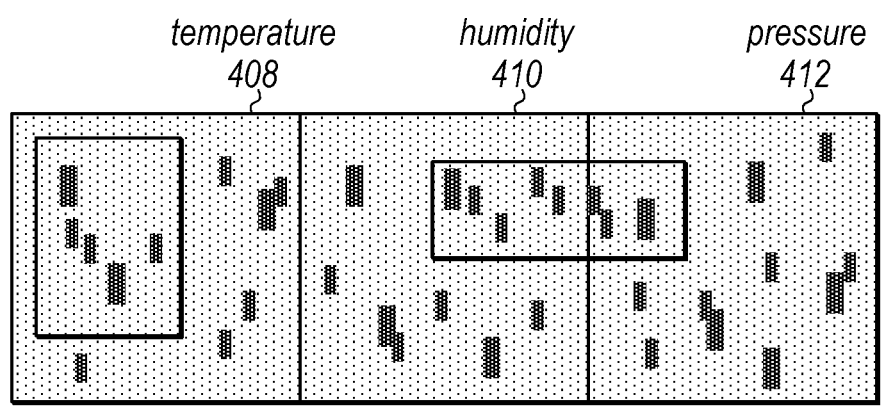
FIG. 4B is an illustration of a spectrogram based on transforming multivariate time series data into image data that includes a failure pattern for a machine, according to some embodiments.

FIG. 4B is an illustration of a spectrogram based on transforming multivariate time series data into image data that includes a failure pattern for a machine, according to some embodiments.

In the example embodiment, an image processing model may be trained based on image data representing one or more different images, including the image of FIG. 4A. The trained image processing model may identify image data (based on subsequently collected time series of data for temperature data 408, humidity data 410, and pressure data 412) that represents the patterns within the two rectangles as similar to the training image data that represents the pattern within the two rectangles of FIG. 4A. Therefore, the image processing model may generate a prediction of failure of the machine due to overheating within a week.

In various embodiments, the trained image processing model may use any suitable technique to identify the image data as similar to the training image data. For example, the trained image processing model may determine that the image data is within a threshold of similarity to the training image data.

In some embodiments, the trained image processing model may determine that the image data is within a threshold of similarity to the training image data by assigning a similarity score that indicates how similar the image data is to the training image data. For example, the score may be an integer of a set of possible numbers (e.g., 1-10 from lowest to highest similarity) that indicate a similarity score. The trained image processing model may determine a similarity score of "9" for the identified image data within the dashed line, indicating that the imaged data is very similar to that of FIG. 4A. In response, the trained image processing model may identify the image data as similar to the training image data and therefore generate a prediction of failure of the machine due to overheating within a week.

Figure 5A:
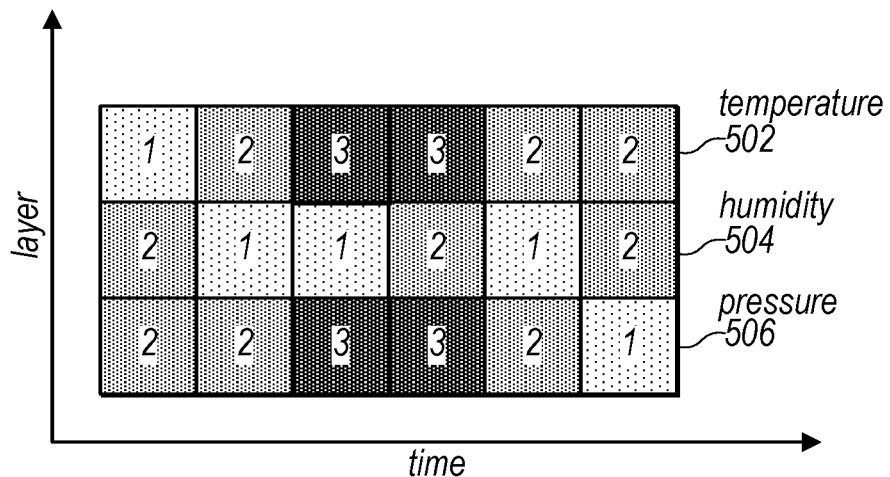
FIG. 5A is an illustration of a lasagna plot based on transforming multivariate time series data into image data, according to some embodiments.

FIG. 5A is an illustration of a lasagna plot based on transforming multivariate time series data into image data, according to some embodiments.

In the depicted embodiment, the image-based prediction service transforms multivariate time series data collected from particular data sources (sensors) for a machine (e.g., on an assembly line at a client site) into image data for a lasagna plot with three layers. The image data includes a set of measurement data representing a lasagna plot. In the depicted example, the set of data includes a time series of temperature data 502, a time series of humidity data 504, and a time series of pressure data 506.

In embodiments, the image generator 122 may analyze one or more different sets of image data that each represent a different lasagna plot that was based on data obtained from the particular data sources over different time periods. For example, the analysis may include analyzing the set of data representing the depicted lasagna plot. Based on the analysis, the image generator 122 may determine that an image processing model may detect different patterns that result in more accurate predictions (or the ability to generate additional predictions such as new types of machine failures) if the order of the layers is changed. Based on the analysis, the image generator 122 may transform a multivariate time series data subsequently received from the particular data sources into a set of image data that represents a lasagna plot with layers that are arranged in a different order.

Figure 5B:
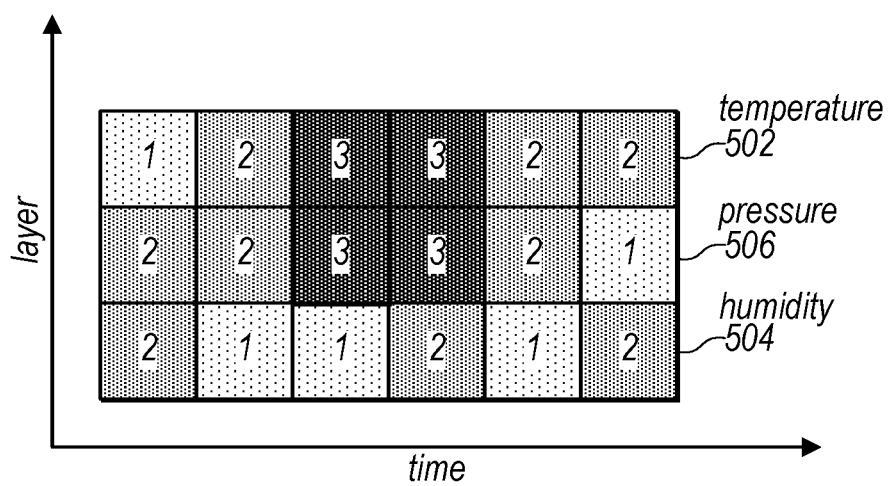
FIG. 5B is an illustration of the lasagna plot of FIG. 5A after changing the order of the layers, according to some embodiments.

FIG. 5B is an illustration of the lasagna plot of FIG. 5A after changing the order of the layers, according to some embodiments.

The image data that represents the depicted lasagna plot may be generated by the image generator 122 based on the same or similar multivariate time series data received from the particular data sources. As shown, the image data represents a lasagna plot with new patterns that may be much more easily detected by an image processing model (e.g., the dark square in the middle of the lasagna plot). In some embodiments, a human may perform at least some of the analysis (e.g., instead of or in addition to the image generator 122) in order to determine if and how the order of the layers should be changed to create patterns that are more easily detected. In embodiments, an image processing model may make more accurate predictions or generate additional predictions such as new types of machine failures based on identifying one or more new patterns as a result of the changing of the order of the layers.

Figure 6A:
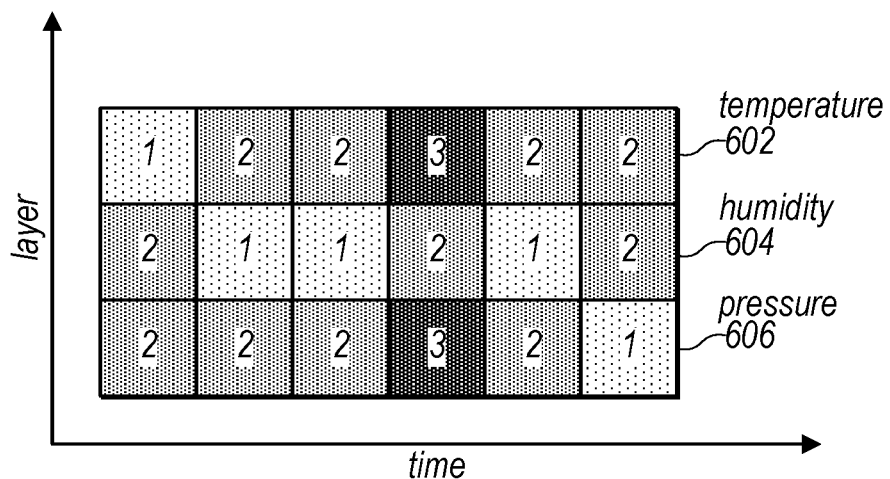
FIG. 6A is an illustration of a lasagna plot based on transforming multivariate time series data into image data, according to some embodiments.

FIG. 6A is an illustration of a lasagna plot based on transforming multivariate time series data into image data, according to some embodiments.

In the depicted embodiment, the image-based prediction service transforms multivariate time series data collected from particular data sources (sensors) for a machine (e.g., on an assembly line at a client site) into image data for a lasagna plot with three layers. The image data includes a set of measurement data representing a lasagna plot. In the depicted example, the set of data includes a time series of temperature data 602, a time series of humidity data 604, and a time series of pressure data 606.

In embodiments, the image generator 122 may analyze one or more different sets of image data that each represent a different lasagna plot that was based on data obtained from the particular data sources over different time periods. For example, the analysis may include analyzing the set of data representing the depicted lasagna plot. Based on the analysis, the image generator 122 may determine that one or more of the layers have little or no effect on generating a prediction, or that an image processing model may detect different patterns that result in more accurate predictions (or the ability to generate additional predictions such as new types of machine failures) if one or more of the layers are removed. Based on the analysis, the image generator 122 may transform a multivariate time series data subsequently received from the particular data sources into a set of image data that represents a lasagna plot with a smaller number of layers (e.g., by removing the corresponding time series of data from the multivariate time series data to generate filtered multivariate time series before generating the image).

Figure 6B:
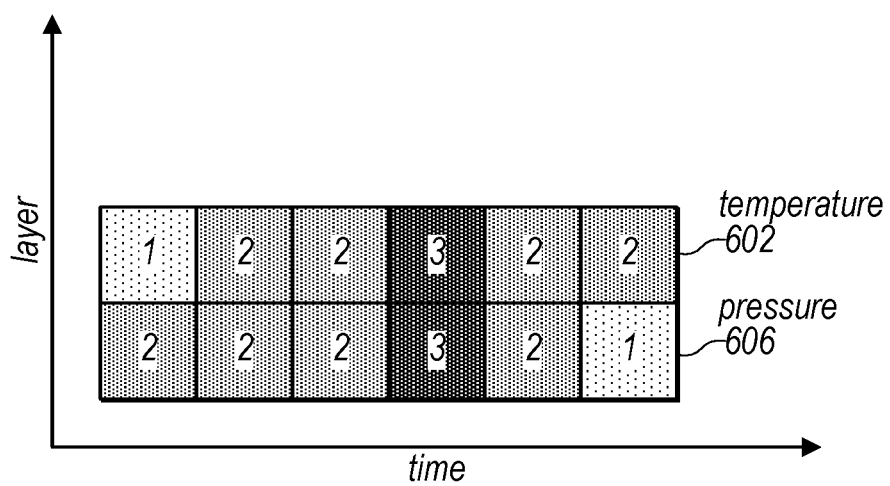
FIG. 6B is an illustration of a lasagna plot based on removing a data series from subsequently received multivariate time series data to generate filtered multivariate time series data, and transforming the filtered multivariate time series data into image data, according to some embodiments.

FIG. 6B is an illustration of a lasagna plot based on removing a data series from subsequently received multivariate time series data to generate filtered multivariate time series data, and transforming the filtered multivariate time series data into image data, according to some embodiments.

The image data that represents the depicted lasagna plot may be generated by the image generator 122 based on the same or similar multivariate time series data received from the particular data sources. As shown, the image data represents a lasagna plot with a smaller number of layers. Moreover, the lasagna plot has new patterns that may be much more easily detected by an image processing model (e.g., the dark square in the middle of the lasagna plot). In some embodiments, a human may perform at least some of the analysis (e.g., instead of or in addition to the image generator 122) in order to determine if and which layers should be removed to create patterns that are more easily detected. In embodiments, an image processing model may make more accurate predictions or generate additional predictions such as new types of machine failures based on identifying one or more new patterns as a result of removing one or more of the layers. Furthermore, the image processing model may generate predictions faster because there are fewer layers to process.

Figure 7:
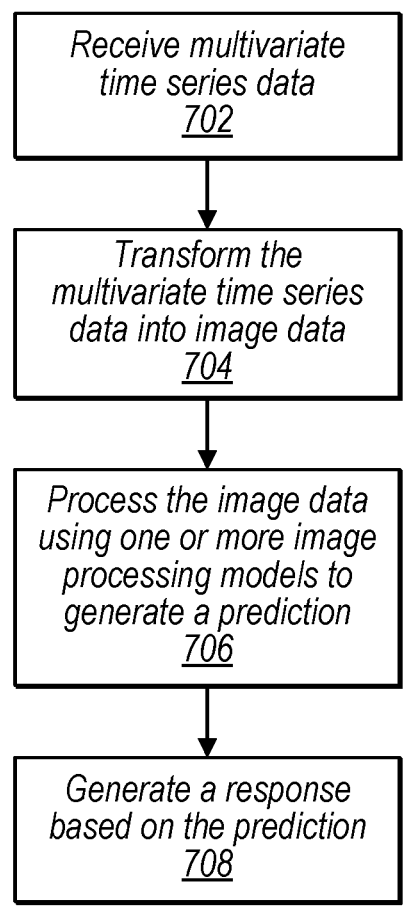
FIG. 7 is a high-level flowchart illustrating various methods and techniques to implement transforming multivariate time series data into image data to generate image-based predictions, according to some embodiments.

FIG. 7 is a high-level flowchart illustrating various methods and techniques to implement transforming multivariate time series data into image data to generate image-based predictions, according to some embodiments. These techniques, as well as the techniques discussed with regard to FIG. 8, may be implemented using components or systems as described above with regard to FIGS. 1-6, as well as other types of components or systems, and thus the following discussion is not intended to be limiting as to the other types of systems that may implement the described techniques. For example, the techniques may be implanted by an image-based prediction service of a provider network and/or a local image-based predictor of a client network.

As indicated at block 702, an image-based prediction service receives multivariate time series data from data sources. At block 704, the image-based prediction service transforms the multivariate time series data into image data (e.g., image data representing a spectrogram heat map, lasagna plot, or other image). At block 706, the image-based prediction service processes the image data using one or more image processing models to generate a prediction. In some embodiments, two or more different models may generate a different prediction and the image-based prediction service may generate a final prediction based on each of the predictions. For example, the same or different weights may be applied to each prediction to generate the final prediction. At block 708, the image-based prediction service generates a response based on the prediction. For example, the image-based prediction service may send the prediction to the remote client network and/or to another endpoint at the provider network for further processing (e.g., to generate an alert or other indication for a predicted type of machine failure and/or a predicted machine failure within a period of time).

Figure 8:
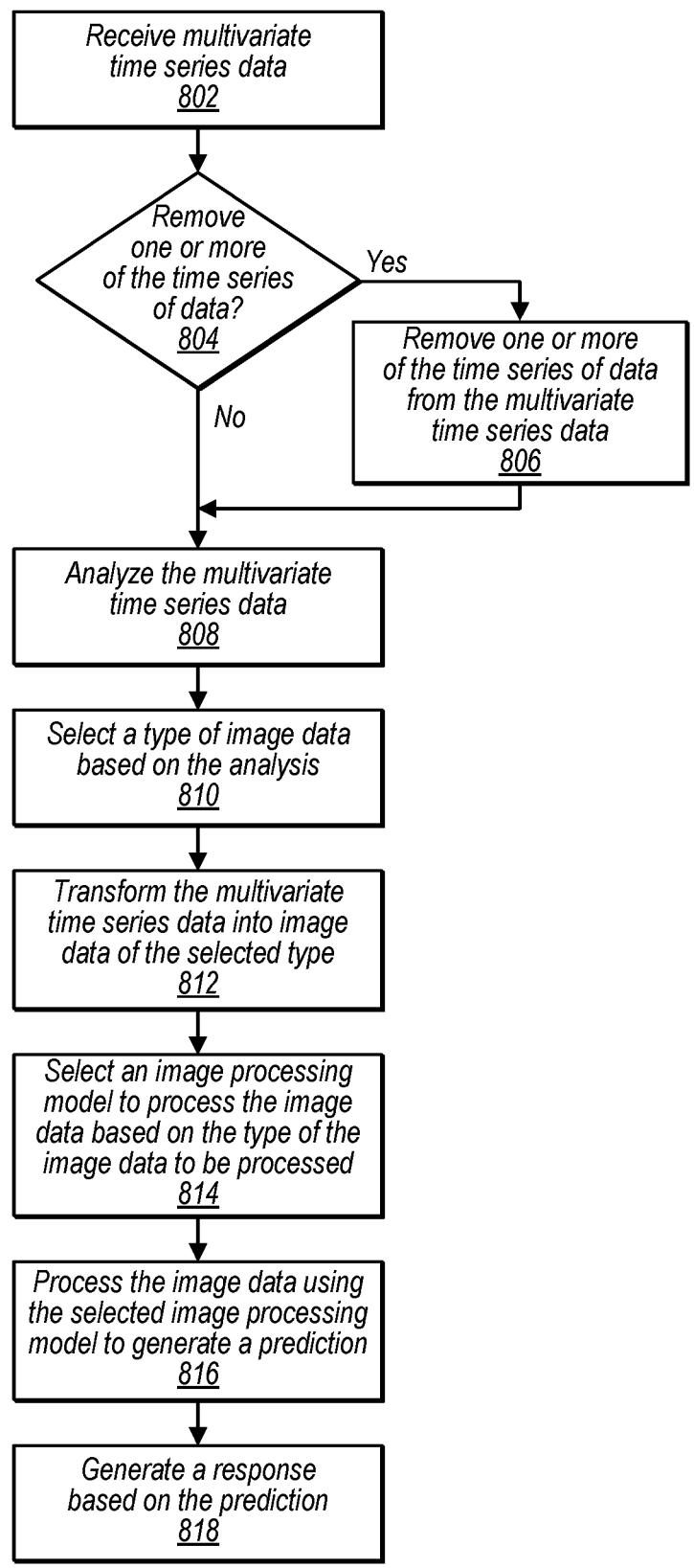
FIG. 8 is a high-level flowchart illustrating various methods and techniques to implement transforming multivariate time series data into image data to generate image-based predictions, according to some embodiments.

FIG. 8 is a high-level flowchart illustrating various methods and techniques to implement transforming multivariate time series data into image data to generate image-based predictions, according to some embodiments.

Note that in some embodiments, the image generator may analyze one or more sets of image data and corresponding predictions that have been made (e.g., based on time series of data obtained from respective data sources over different time periods). For example, the image generator may determine that one or more of the time series of data from particular data sources has little or no effect on generating predictions. Based on the analyses, the image generator may remove those one or more time series of data from multivariate time series data subsequently received from the respective data sources to generate filtered multivariate time series data.

At block 802, the image-based prediction service receives multivariate time series data. At block 804, the image-based prediction service determines whether to remove one or more of the time series data (e.g., based on a previous determination that they have little or no effect on predictions).

If the image-based prediction service determines to remove one or more of the time series of data, then at block 806, the image-based prediction service removes one or more of the time series of data from the multivariate time series data. If not, then the process proceeds to block 808. At block 808, the image-based prediction service analyzes the multivariate time series data. At block 810, the image-based prediction service selects a type of image data based on the analysis (e.g., lasagna plot, spectrogram, etc.). At block 812, the image-based prediction service transforms the multivariate time series data into image data of the selected type.

At block 814 the image-based prediction service selects an image processing model to process the image data based on the type of the image data to be processed. At block 816, the image-based prediction service processes the image data using the selected image processing model(s) to generate a prediction. At block 818, the image-based prediction service generates a response based on the prediction. For example, the image-based prediction service may send the prediction to the remote client network and/or to another endpoint at the provider network.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of the image-based prediction service, local image-based predictor, models, and other components that implement the techniques described herein). The various methods as illustrated in the figures and described herein represent example embodiments of methods. The order of any method may be changed, and various elements may be added, reordered, combined, omitted, modified, etc.

Figure 9:
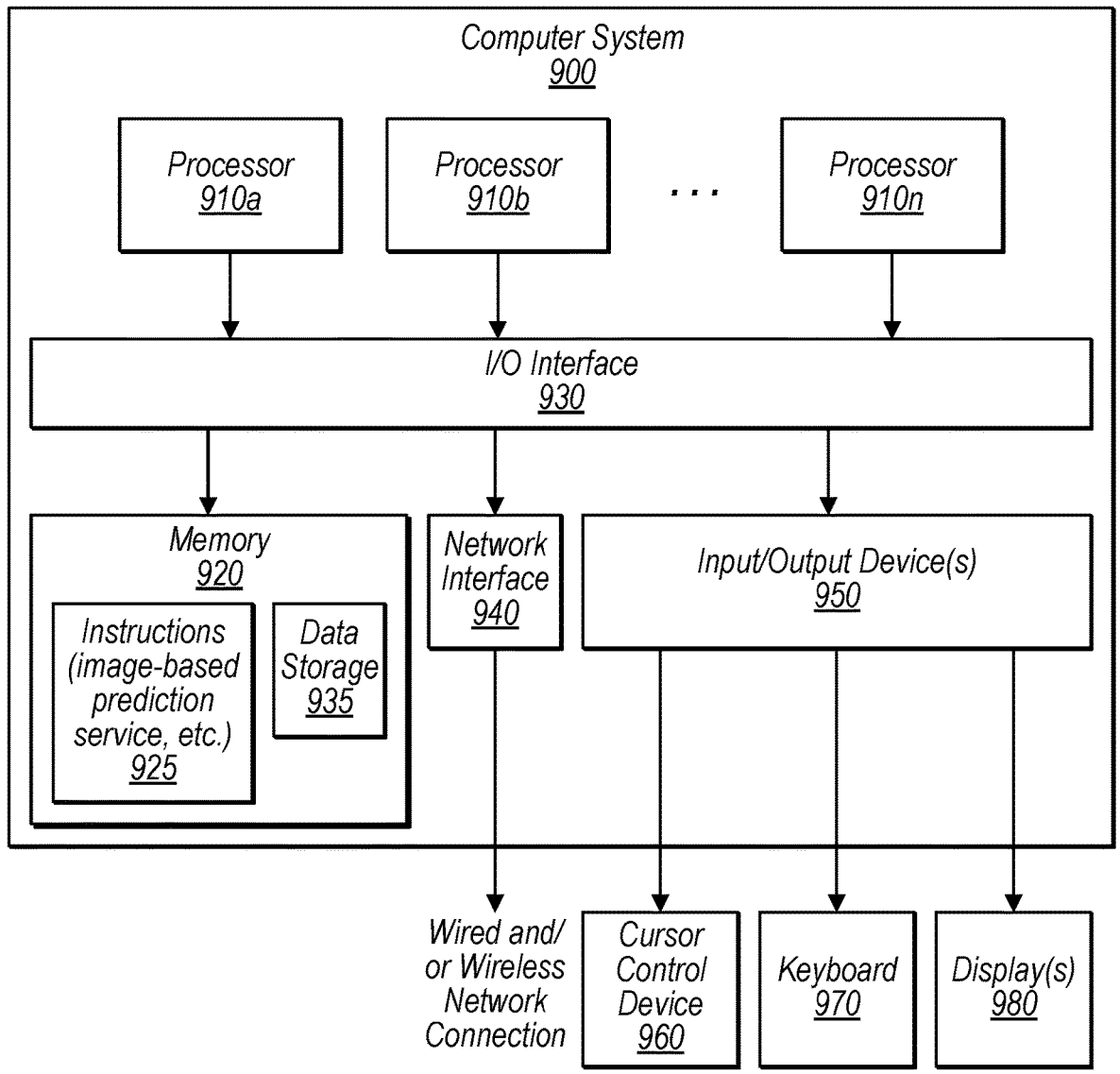
FIG. 9 is a block diagram illustrating an example computing system, according to some embodiments.

Embodiments to implement transforming multivariate time series data into image data to generate image-based predictions as described herein may be executed on one or more computer systems, which may interact with various other systems or devices. One such computer system is illustrated by FIG. 9. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the image-based prediction service, local image-based predictor, models, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., models, image data, multivariate time series data, predictions, training data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   one or more memories, wherein the one or more memories have stored thereon instructions, which when executed by the one or more processors, cause the one or more processors to implement an image-based prediction service for a plurality of clients of a provider network, wherein the image-based prediction service is configured to, for a given client:
   receive, from a remote network of the client, multivariate time series data, wherein the multivariate time series data comprises different time series of data obtained from respective data sources over a time period;
   transform the multivariate time series data into image data, wherein the image data comprises a set of data representing an image;
   process the image data using one or more image processing models to generate prediction associated with the remote network; and
   send the prediction to the remote network or to another endpoint.

2. The system as recited in claim 1, wherein to transform the multivariate time series data, the image-based prediction service is configured to:
   transform the multivariate time series data into image data comprising a set of data representing a heat map, wherein the set of data comprises different values that represent one or more of different colors or different intensities at different locations of a heat map, wherein at least some of the values are lower than a portion of the values and higher than another portion of the values.

3. The system as recited in claim 1, wherein to transform the multivariate time series data into image data, the image-based prediction service is configured to:
   transform each of the time series of data into a subset of the image data to generate a plurality of subsets of the image data, wherein a given subset of the image data comprises different values that represent varying amounts of one or more of color or intensity; and
   generate the set of data representing the image, based on the plurality of subsets of the image data.

4. The system as recited in claim 1, wherein to transform the multivariate time series data, the image-based prediction service is configured to:
   analyze the multivariate time series data; and
   based at least on the analysis, select, from among a plurality of available types of image data, a type of image data to transform the multivariate time series data into; and
   transform the multivariate time series data into the image data of the selected type.

5. The system as recited in claim 1, wherein the image-based prediction service is further configured to:
   select, from among a plurality of available image processing models configured to process different types of image data, the one or more image processing models to process the image data based on the type of the image data to be processed.

6. A method, comprising:
   performing, by one or more computing devices:
   receiving multivariate time series data, wherein the multivariate time series data comprises different time series of data obtained from respective data sources over a time period;
   transforming the multivariate time series data into image data, wherein the image data comprises a set of data representing an image;
   processing the image data using one or more image processing models to generate a prediction; and
   generating a response based on the prediction.

7. The method as recited in claim 6, wherein the set of data representing the image comprises different values that represent one or more of different colors or different intensities at different locations of a heat map, wherein at least some of the values are lower than a portion of the values and higher than another portion of the values.

8. The method as recited in claim 6, wherein transforming the multivariate time series data comprises:
   transforming each of the time series of data into a subset of the image data to generate a plurality of subsets of the image data, wherein a given subset of the image data comprises different values that represent varying amounts of one or more of color or intensity; and
   generating the set of data representing the image, based on the plurality of subsets of the image data.

9. The method as recited in claim 8, wherein each of the subsets of the image data represents a different spectrogram or a different layer of a lasagna plot.

10. The method as recited in claim 8, wherein each of the subsets of the image data represents one of a plurality of layers of a lasagna plot, and wherein processing the image data using one or more image processing models comprises:
   applying one dimensional convolution along each of the subsets of the image data that represent a layer of the lasagna plot.

11. The method as recited in claim 8, wherein each of the subsets of the image data represents one of a plurality of layers of a lasagna plot that are arranged in a particular order, and further comprising:
   analyzing one or more sets of image data that each represent a lasagna plot that was based on data obtained from the respective data sources over different time periods, wherein the analysis comprises analyzing at least the set of data representing the lasagna plot; and
   based on the analysis, transforming data subsequently received from the respective data sources into another set of image data that represents another lasagna plot with a plurality of layers that are arranged in a different order than the particular order.

12. The method as recited in claim 8, wherein each of the subsets of the image data represents one of a plurality of layers of a lasagna plot, and further comprising:
   analyzing one or more sets of image data that each represent a lasagna plot that was based on data obtained from the respective data sources over different time periods, wherein the analysis comprises analyzing at least the set of data representing the lasagna plot; and
   based on the analysis, transforming data subsequently received from the respective data sources into another set of image data that represents another lasagna plot with a smaller number of layers than the lasagna plot.

13. The method as recited in claim 6, further comprising:
   for individual ones of the different time series of data, determine one or more of a type of data collected for the time series of data or a type of sensor used to collect data for the time series of data;
   based at least on the determination, selecting, from among a plurality of available types of image data, a type of image data to transform the multivariate time series data into; and
   transforming the multivariate time series data into the image data of the selected type.

14. The method as recited in claim 1, further comprising:
   obtaining training data, wherein the training data comprises different image data and corresponding predictions, wherein the predictions comprise one or more of: failure of a device within a particular period of time, or a type of failure of the device; and
   training the one or more image processing models based on the training data.

15. One or more non-transitory computer-accessible storage media storing program instructions that when executed on or across one or more processors cause the one or more processors to:
   receive multivariate time series data, wherein the multivariate time series data comprises different time series of data obtained from respective data sources over a time period;
   transform the multivariate time series data into image data, wherein the image data comprises a set of data representing an image;
   process the image data using one or more image processing models to generate a prediction; and
   send the prediction to an endpoint.

16. The one or more storage media as recited in claim 15, wherein the set of data representing the image comprises different values that represent one or more of different colors or different intensities at different locations of a heat map, wherein at least some of the values are lower than a portion of the values and higher than another portion of the values.

17. The one or more storage media as recited in claim 15, wherein to transform the multivariate time series data into image data, the program instructions when executed on or across the one or more processors cause the one or more processors to:
   transform each of the time series of data into a subset of the image data to generate a plurality of subsets of the image data, wherein a given subset of the image data comprises different values that represent varying amounts of one or more of color or intensity; and
   generate the image data based on the plurality of subsets of the image data.

18. The one or more storage media as recited in claim 15, wherein the different time series of data comprise sensor measurements associated with a device over the time period, and further comprising program instructions that when executed on or across the one or more processors cause the one or more processors to:
   receive additional device data indicating one or more of a configuration or a location of the device; and
   wherein to process the image data, the program instructions when executed on or across the one or more processors cause the one or more processors to:
      process the image data and the additional device data using the one or more image processing models to generate the prediction.

19. The one or more storage media as recited in claim 15, wherein the different time series of data comprise different types of data obtained from different sensors associated with a device, and wherein the prediction indicates one or more of:
   failure of a device within a particular period of time, or a type of failure of the device.

20. The one or more storage media as recited in claim 15, and further comprising program instructions that when executed on or across the one or more processors cause the one or more processors to:
   analyzing one or more sets of image data and corresponding predictions, wherein the one or more sets of image data are based on time series of data obtained from the respective data sources over different time periods, and wherein the analysis comprises analyzing at least the set of image data and the corresponding prediction; and
   based on the analysis, remove one or more time series of data from additional multivariate time series data subsequently received from the respective data sources to generate filtered multivariate time series data;

transform the filtered multivariate time series data into additional image data, wherein the additional image data comprises a set of data representing an additional image; and process the additional image data using the one or more image processing models to generate an additional prediction.

* * * * *

UNITED STATES PATENT AND TRADEMARK OFFICE
CERTIFICATE OF CORRECTION

| | | |
|---|---|---|
| PATENT NO. | : 11,310,349 B1 | Page 1 of 1 |
| APPLICATION NO. | : 16/878506 | |
| DATED | : April 19, 2022 | |
| INVENTOR(S) | : David L Pan and Roger Thomas John Moffatt | |

It is certified that error appears in the above-identified patent and that said Letters Patent is hereby corrected as shown below:

On the Title Page

In item (72) Inventors, please add "John Kevin Byrne, Seattle, WA (US)"

Signed and Sealed this
Fourth Day of April, 2023

Katherine Kelly Vidal
*Director of the United States Patent and Trademark Office*